United States Patent [19]
Burkhart

[11] 3,735,591
[45] May 29, 1973

[54] MAGNETO-PLASMA-DYNAMIC ARC THRUSTER

[75] Inventor: James A. Burkhart, Olmsted Falls, Ohio

[73] Assignee: The United States of America as represented by the Administrator of the National Aeronautics and Space Administration, Washington, D.C.

[22] Filed: Aug. 30, 1971

[21] Appl. No.: 175,852

[52] U.S. Cl. .....................60/202, 313/161, 313/231
[51] Int. Cl. ................................................F03h 5/00
[58] Field of Search ...........................60/202, 203; 313/231, 63, 161

[56] References Cited
UNITED STATES PATENTS

| 3,308,621 | 3/1967 | Pinsley | 60/202 |
| 3,360,682 | 12/1967 | Moore | 60/202 |
| 3,326,769 | 6/1967 | Neidigh et al. | 313/63 |
| 3,076,114 | 1/1963 | Hicks | 313/161 |
| 3,309,873 | 3/1967 | Cann | 60/203 |
| 3,232,046 | 2/1966 | Meyer | 60/202 |
| 3,226,592 | 12/1965 | Gough et al. | 60/202 |

Primary Examiner—Carlton R. Croyle
Assistant Examiner—Robert E. Garrett
Attorney—N. T. Musial, G. E. Shook and John R. Manning

[57] ABSTRACT

Improving the performance of a magneto-plasma-dynamic arc thruster in the 600 to 2,100 seconds specific impulse range by locating its cathode in the exhaust beam downstream of the anode and main propellant injection point.

10 Claims, 4 Drawing Figures

PATENTED MAY 29 1973

INVENTOR
JAMES A. BURKHART

BY Norman T. Musial
Gene E. Shook ATTORNEYS

MAGNETO-PLASMA-DYNAMIC ARC THRUSTER

STATEMENT OF GOVERNMENT OWNERSHIP

The invention described herein was made by an employee of the United States Government and may be manufactured and used by or for the Government for governmental purposes without the payment of any royalties thereon or therefor.

BACKGROUND OF THE INVENTION

This invention is concerned with the production of rocket thrust in the hard vacuum of outer space. The invention is particularly directed to an improved electric rocket of the magneto-plasma-dynamic, MPD, type.

Various types of electric rockets have been proposed for use in outer space. Rockets having specific impulses up to 2,100 seconds are of particular interest for auxiliary propulsion applications. Conventional low power MPD arc thrusters have been used where specific impulses in the range of 100 seconds to 1,500 seconds are required. However, the thrust efficiency of these thrusters is quite low. While specific impulses of 1,500 seconds to 2,100 seconds are potentially useful for satellite station keeping and attitude control missions, these conventional low power MPD arc thrusters have not been operated above a specific impulse of 1,500 seconds.

Electron bombardment ion thrusters have been operated in the 1,700 seconds to 1,900 seconds specific impulse range. These thrusters have a great number of mechanical and electrical components. Hence, the system is very complex. Resistojets have also been proposed for these applications. However, resistojets operate only at specific impulses under 800 seconds. Thermal arc jets, pulsed plasma thrusters, cesium contact ion thrusters and colloidal thrusters are not highly developed and are not as efficient as electron bombardment thrusters and resistojets. Thus they are not considered for space applications.

SUMMARY OF THE INVENTION

The problems encountered with prior art thrusters have been solved by the present invention. An MPD arc thruster constructed in accordance with the invention has its cathode located in the actual exhaust beam. The cathode is downstream of the anode and main propellant injection point. This construction eliminates an impressed electrostatic field which tends to accelerate ions toward the backplate causing backplate loss. In this thruster the electrostatic field is directed downstream which tends to accelerate ions out of the exhaust.

This MPD arc thruster is quite competitive with an ion thruster in the specific impulse range of 1,300 to 2,000 seconds. Also the ratio of thrust to device cross-sectional area is quite high for the MPD arc thruster.

OBJECTS OF THE INVENTION

It is, therefore, an object of the present invention to provide a thruster for satellite station keeping and attitude control.

Another object of the invention is to provide an improved support for a cathode in an MPD arc thruster.

A further object of the invention is to provide a reliable MPD arc thruster of simple design which has a minimum number of mechanical and electrical components for use in the specific impulse range of 600 to 2,100 seconds.

These and other objects of the invention will be apparent from the specification which follows and from the drawings wherein like numerals are used to identify like parts.

IN THE DRAWINGS

DESCRIPTION OF THE PREFERRED EMBODIMENT

Figure 1:
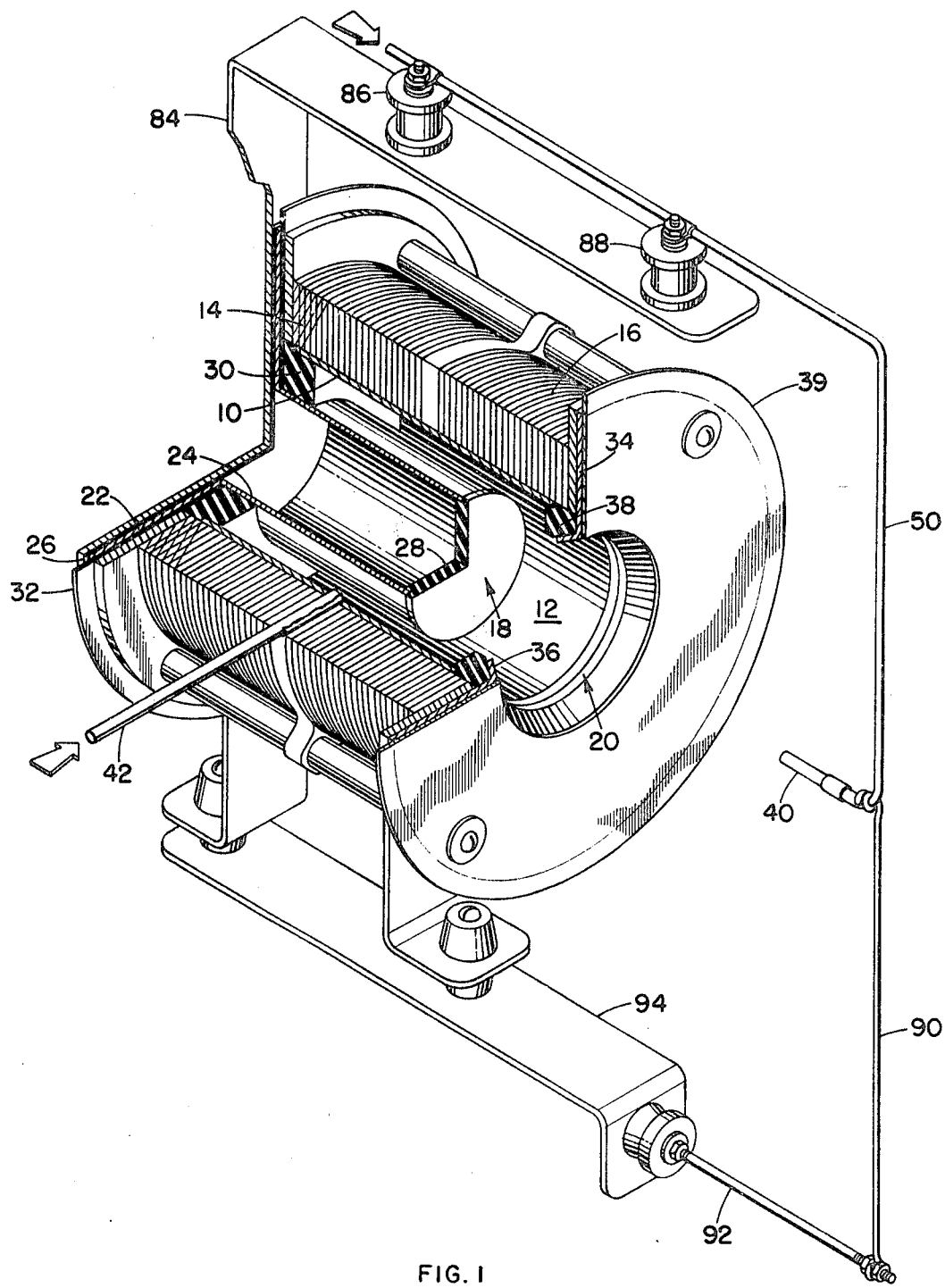
FIG. 1 is a perspective view showing an axial quarter section through a low powered MPD arc thruster constructed in accordance with the present invention.

Referring now to the drawings there is shown in FIG. 1 an improved MPD arc thruster constructed in accordance with the present invention. This thruster utilizes a hollow cylindrical anode 10 which forms a discharge chamber 12. Two electromagnets 14 and 16 establish a direct current magnetic field which is primarily parallel to the thruster axis passing through the discharge chamber 12. The electromagnets 14 and 16 are edge-wound with each turn being quite thin. The turns are joined together by overlapping one turn with the next and resistance welding the seam. While two electromagnets have been shown and described it is contemplated that the upstream magnet 14 may be removed in certain applications where a reduction in thruster weight is of paramount importance.

A small angle of divergence between the axial and radial directions exists in the magnetic flux density. A desired angle of divergence is established by two pole pieces 18 and 20 that are constructed of mild steel, such as 1020 low carbon steel. All surfaces of the pole pieces 18 and 20 are flame sprayed with aluminum oxide to insulate them from the plasma.

The upstream pole piece 18 comprises a thin circular disc 22 welded to a right circular cylinder 24. The disc portion 22 is mounted on a boron nitride insulator 26 at the upstream end of the discharge chamber 12. The cylinder 24 extends into the discharge chamber 12. A boron nitride insulating cap 28 is placed over the downstream end of the cylinder 24 to inhibit particle diffusion and acceleration into the inside of the pole piece 18. Contact between the upstream pole piece 18 and the anode 10 is prevented by a torous shaped insulator 30 of boron nitride. A circular insulator 32 encircles the pole piece cylinder 24 to separate the disc portion 22 of the pole piece 18 from the electromagnet 14.

The exhaust end pole piece 20 comprises a thin circular disc 34 having a beveled portion 36 along the inside diameter. Contact between the pole piece 20 and the anode 10 is prevented by a boron nitride insulator 38. The pole piece 20 is covered by a circular insulating plate 39.

The pole pieces 18 and 20 are positioned to greatly reduce backplate loss. In the conventional thruster the field established by the magnets diverges away from the thruster axis at the backplate. A magnetic expansion process is operative in accelerating ions into the backplate. The pole pieces 18 and 20 of the thruster constructed in accordance with the invention shape the field such that it converges at the insulators 28 and 30 (backplates) thereby acting like a magnetic mirror and inhibiting magnetic expansion against them.

In operation an electrical discharge is maintained between the cylindrical anode 10 and a cathode 40 which will be described later in greater detail. The electrical discharge is supported by the magnetic field.

Figure 2:
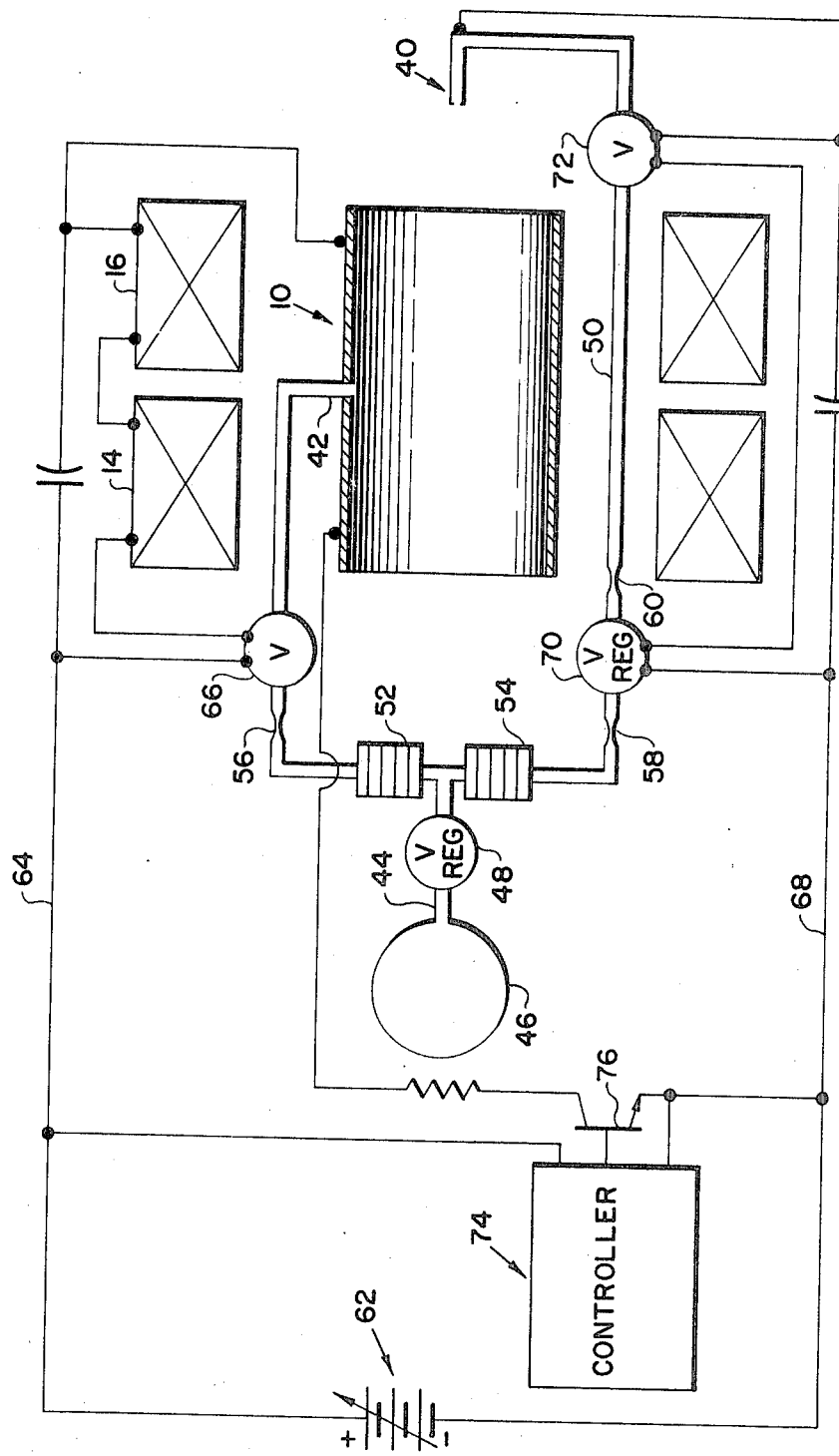
FIG. 2 is a schematic diagram of an MPD arc thruster and circuitry of the invention.

A suitable propellant gas, such as xenon, is introduced into the electrical discharge or arc through a feed tube 42. This feed tube extends through the cylindrical anode 10 adjacent the pole piece 18 as shown in FIG. 1. A supply line 44 connects the feed tube 42 to a supply tank 46 through a pressure regulator 48 as shown in FIG. 2. A similar feed tube 50 connects this supply line 44 to the cathode 40. Electrical isolators 52 and 54 are incorporated into the feed tubes 42 and 50, respectively. These isolators may be of the type shown in U.S. Pat. Nos. 3,336,748 and 3,576,107.

The fluid propellant flow through the feed tube 42 is regulated by a choke orifice 56. Similar choke orifices 58 and 60 are provided in the feed tube 50. The choke orifices proportion the propellant flow so that 80 percent or more of the propellant enters the anode through the feed tube 42. The remainder of the flow enters the thruster through the cathode 40.

The MPD arc thruster has a single direct current power supply 62. A positive lead 64 from the power supply is connected to the anode 10 through a starting valve 66 and electromagnets 14 and 16 in series. The opposite side of the power supply 62 is connected to the cathode 40 by a negative lead 68 through a regulating valve 70 and a starting valve 72 in series. A variable level DC power supply in the range of 180 volts to 320 volts has been satisfactory. In contrast, electron bombardment ion thrusters of the prior art utilize many power supplies, some of which are 600 volts to 800 volts.

A controller 74 containing transistor sequence logic for starting and stopping this thruster is connected to the power leads 64 and 68. At start up the controller 74 closes a transistor switch 76 establishing current flow in the magnets 14 and 16 and opening the starting valves 66 and 72. A short time later the switch 76 is reopened by the controller 74 generating a high voltage wave form between the anode 10 and the cathode 40 which is sufficient to ignite the discharge.

Figure 3:
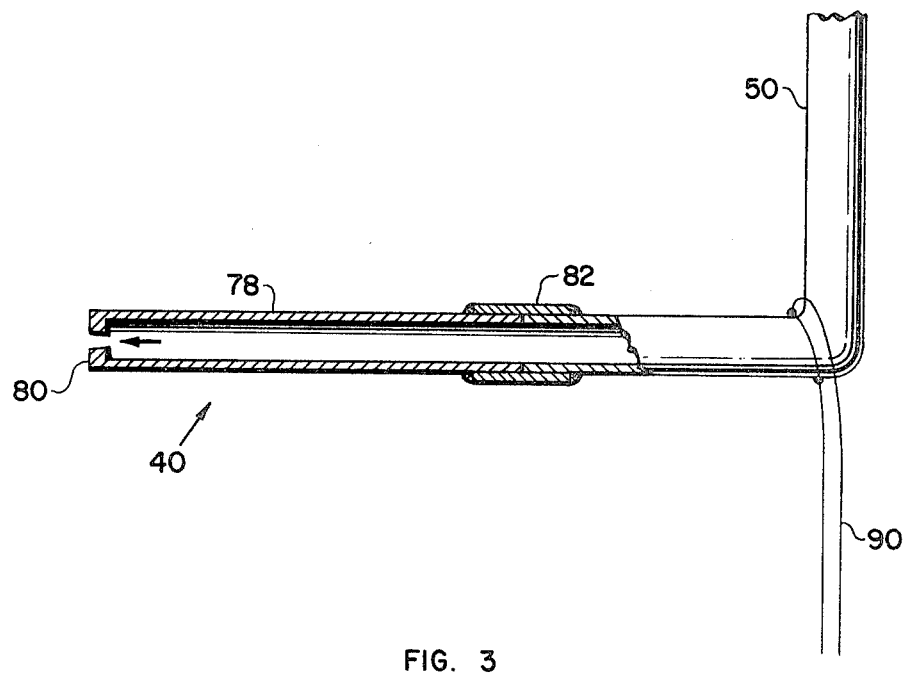
FIG. 3 is an enlarged axial section view of a cathode embodying features of the invention.

According to the invention the hollow cathode 40 is supported in the exhaust beam in the manner shown in FIGS. 1 and 3. The cathode 40 comprises a hollow tube 78 of 2 percent thoriated tungsten. By way of example, a hollow tube 2.46 cm long with an outside diameter of 0.318 cm, has been satisfactory. This hollow tube is provided with an orifice plate 80 at the cathode tip. A plate 80 having a thickness of 0.076 cm has been satisfactory. The hollow tube 78 and the orifice plate 80 are electric discharge machined from a single piece of 2 percent thoriated tungsten. The small orifice of the center of the plate 80 has a slight taper. By way of example the 0.076 cm thick plate had an orifice with a 0.033 cm inside diameter at the exit plane and a 0.025 cm inside diameter at the inside surface.

As best shown in FIG. 1 the feed tube 50 not only supplies propellant to the cathode 40 but also serves as its support. A hollow tube 50 of tantalum has been satisfactory for these purposes. The tube 50 extends along the length of the thruster at the top and is bent to join the hollow cathode 40 at a sleeve 82. A bracket 84 is mounted at the upstream edge of the thruster for carrying the feed tube 50. Insulators 86 and 88 are provided for mounting the feed tube 50 to the bracket 84.

A tantalum wire 90 is likewise provided for supporting the tube 50. The wire 90 is secured to a support 92 mounted on a bracket 94. Both the feed tube 50 and the wire 90 are at cathode potential and are aligned vertically to maintain electrical symmetry during operation.

In operation ion bombardment of the thoriated tungsten orifice plate 80 keeps the cathode tip heated to a temperature of approximately 1,850°K which is sufficient to maintain the thruster discharge current. The tantalum tube 50 and tantalum wire 90 supporting the cathode structure 40 remain relatively cool during normal operation.

When cathode propellant is used it leaves the cathode from the small orifice in the cathode plate 80 and actually flows out of the cathode in an upstream direction relative to the exhaust beam. Cathode propellant is always used to start the discharge. The discharge current attaches either at the inside diameter of the orifice hole or slightly behind it inside the hollow tube. The discharge current remains there even if the cathode flow is subsequently removed.

Although the thrust of an MPD arc thruster constructed in accordance with the invention has been carefully measured on a parallelogram-pendulum thrust stand, the exact mechanics of the thrust production have not been fully established. It is believed that part of the hot electron gas formed in the electrical discharge is accelerated by expansion in the magnetic field of the thruster. The ions are then accelerated by the Coulomb attraction to the magnetically accelerated electrons.

Figure 4:
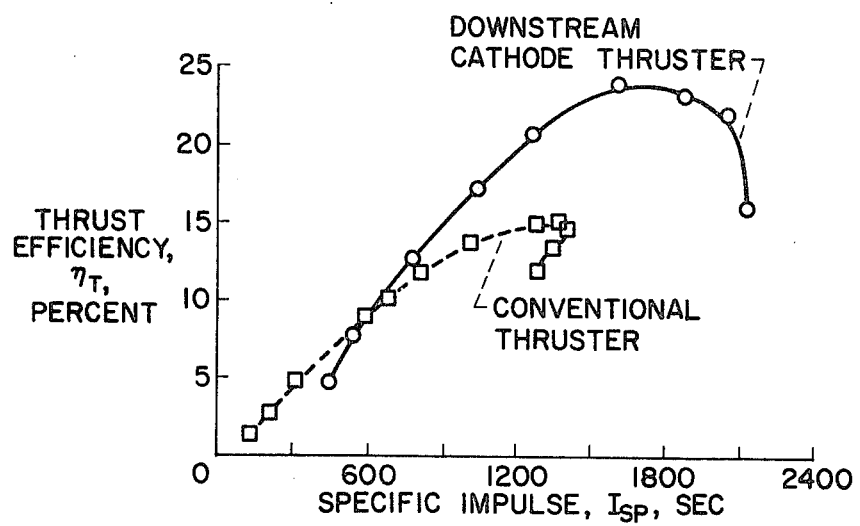
FIG. 4 is a graph showing the performance of an MPD arc thruster constructed in accordance with the invention compared to that of a conventional low power MPD arc thruster.

FIG. 4 is a comparison of the performance of a low-power MPD thruster constructed in accordance with the invention and the performance of a conventional low-power MPD thruster. Specific impulse is given by $I_{sp} = T/mg$ and the thrust efficiency is given by $\eta_T = T^2/2 m P_d$. $T$ is the thrust measured, $m$ is the mass flow rate measured, $g$ is the gravitational constant, and $P_d$ is measured power supplied to the discharge arc.

FIG. 4 shows the thrust efficiency of an MPD arc thruster constructed in accordance with the invention is superior to that of a conventional thruster in the specific impulse range of 600 to 2,100 seconds. The conventional low-power thruster was not operated above a specific impulse of 1500 seconds.

A low power electron bombardment ion thruster has been operated in the 1,700 to 1,900 seconds specific impulse range at 29 percent thrust efficiency. In this same range an MPD arc thruster constructed in accordance with the invention has a thrust efficiency of 23 to 24 percent. However, for space flight applications, the MPD arc thruster is preferred because it is less complex and requires a lower operating time.

While the preferred embodiment of the invention has been shown and described it will be apparent that various modifications may be made to the disclosed structure without departing from the spirit of the invention or the scope of the subjoined claims. By way of example, it is contemplated that the thruster may have a ground screen which surrounds the entire thruster except for the exhaust beam. Also the ground screen could surround all the thruster components except the cathode and cathodes support structure. These ground screens would be made electrically common with a cathode potential or with the spacecraft potential. The screen could also be allowed to float electrically.

What is claimed is:

1. A magneto-plasma-dynamic arc thruster of the type wherein a propellant is ionized in an arc to form a plasma exhaust beam, said thruster comprising
    a hollow cylindrical anode forming a chamber having an open end from which said beam is exhausted,
    means for injecting a propellant gas into said chamber,
    magnet means for forming a magnetic field through said chamber to support an electrical discharge therein,
    magnetic pole pieces mounted at opposite ends of said chamber for shaping the magnetic flux density of said magnetic field to direct said beam through said open end of said chamber,
    a cathode of a thermionic emitting material spaced from the open end of said chamber downstream thereof, and
    power supply means connected to said anode and said cathode for generating said arc to form said exhaust beam,
    said cathode being mounted in said exhaust beam whereby ions bombard said thermionic material thereby heating the same to a temperature sufficient to maintain thruster discharge current.

2. An MPD arc thruster as claimed in claim 1 and including at least one hollow tube extending through a wall of said hollow cylindrical anode for placing said chamber in communication with a supply of propellant.

3. An MPD arc thruster as claimed in claim 2 including a supply of xenon connected to said tube.

4. An MPD arc thruster of the type claimed in claim 1 including an electromagnet surrounding said hollow cylindrical chamber.

5. An MPD arc thruster as claimed in claim 4 including at least one hollow tube extending through the electromagnet and hollow cylindrical anode for placing said chamber in communication with a source of liquid propellant.

6. An MPD arc thruster as claimed in claim 1 including a hollow magnetic pole piece mounted at the upstream end of said hollow cylindrical anode and extending into said chamber, and
    another magnetic pole piece positioned between said cathode and said anode, said hollow and other pole pieces establishing a pre-determined angle at divergence of the magnetic flux density in the magnetic field.

7. An MPD arc thruster as claimed in claim 1 wherein the cathode comprises
    a hollow tube positioned along the axis of the anode downstream thereof, and
    means for passing propellant through said hollow tube.

8. An MPD arc thruster as claimed in claim 7 including a plate mounted in the end of said hollow tube, said plate having an orifice therein for directing propellant toward the anode.

9. In a magneto-plasma-dynamic arc thruster of the type wherein an arc ionizes a propellant to form a plasma exhaust beam, the improvement comprising
    means for mounting a thermionic emitting cathode in said exhaust beam downstream of an anode whereby ions bombard said cathode during thruster operation thereby heating the same to a temperature sufficient to maintain thruster discharge current,
    means for directing propellant through said cathode towards said anode for starting the discharge, and
    means for generating a high voltage wave form between the anode and the cathode to ignite said discharge thereby starting said thruster.

10. An MPD arc thruster as claimed in claim 9 including means for forming a diverging magnetic field toward the end of said anode adjacent said cathode.

* * * * *

UNITED STATES PATENT OFFICE
CERTIFICATE OF CORRECTION

Patent No. 3,735,591　　　　　　　Dated May 29, 1973

Inventor(s) JAMES A. BURKHART

It is certified that error appears in the above-identified patent and that said Letters Patent are hereby corrected as shown below:

Column 6, line 3, cancel "liquid" and insert therefor --gaseous--; line 11, cancel "at" and insert therefor --of--; line 12, cancel "density".

Signed and sealed this 20th day of November 1973.

(SEAL)
Attest:

EDWARD M. FLETCHER, JR.　　　　　　RENE D. TEGTMEYER
Attesting Officer　　　　　　　　　Acting Commissioner of Patents